US 11,595,587 B2

(12) United States Patent
Hardå et al.

(10) Patent No.: US 11,595,587 B2
(45) Date of Patent: Feb. 28, 2023

(54) VEHICLE SURROUNDINGS OBJECT DETECTION IN LOW LIGHT CONDITIONS

(71) Applicant: Zenuity AB, Gothenburg (SE)

(72) Inventors: Peter Hardå, Torslanda (SE); Per Landfors, Hisings Backa (SE)

(73) Assignee: Zenuity AB, Gothenburg (SE)

( * ) Notice: Subject to any disclaimer, the term of this patent is extended or adjusted under 35 U.S.C. 154(b) by 0 days.

(21) Appl. No.: 17/407,723

(22) Filed: Aug. 20, 2021

(65) Prior Publication Data
US 2022/0070354 A1   Mar. 3, 2022

(30) Foreign Application Priority Data

Aug. 28, 2020 (EP) .................................... 20193275

(51) Int. Cl.
*H04N 5/235* (2006.01)
*G06V 10/141* (2022.01)
(Continued)

(52) U.S. Cl.
CPC ............. *H04N 5/2354* (2013.01); *B60Q 1/32* (2013.01); *B60Q 1/50* (2013.01); *B60R 11/04* (2013.01);
(Continued)

(58) Field of Classification Search
CPC ...... H04N 5/2354; H04N 5/2351; H04N 7/18; B60Q 1/32; B60Q 1/50; B60Q 1/04;
(Continued)

(56) References Cited

U.S. PATENT DOCUMENTS

| 9,863,928 B1* | 1/2018 | Peterson ................. G01N 33/42 |
| 10,025,995 B2 | 7/2018 | Sorstedt et al. |

(Continued)

FOREIGN PATENT DOCUMENTS

| DE | 102010033387 A1 | 3/2011 |
| DE | 102014009421 A1 | 12/2015 |

(Continued)

OTHER PUBLICATIONS

European Search Report dated Mar. 11, 2021 for International Application No. 20193275.3 filed on Aug. 28, 2020, consisting of 8-pages.

*Primary Examiner* — Marnie A Matt
(74) *Attorney, Agent, or Firm* — Christopher & Weisberg, P.A.

(57) ABSTRACT

A method performed by a vision control system for supporting in low light conditions in surroundings of a moving vehicle, object detection by at least a first on-board rearward- and/or sideward-facing image capturing device. The vision control system captures a surrounding located rearward and/or sideward of the moving vehicle with support from the at least first image capturing device. The vision control system further determines light conditions in the surrounding. Moreover, the vision control system provides with support from at least a first light source, when the light conditions fulfill insufficient light criteria, a light output illuminating a ground region of the surrounding to facilitate object detection by the at least first image capturing device. The disclosure also relates to a vision control system, a vehicle comprising such a vision control system, and a respective corresponding computer readable storage medium.

17 Claims, 5 Drawing Sheets

(51) Int. Cl.
*G06V 20/56* (2022.01)
*B60Q 1/32* (2006.01)
*B60Q 1/50* (2006.01)
*B60R 11/04* (2006.01)
*H04N 7/18* (2006.01)
*B60Q 1/04* (2006.01)

(52) U.S. Cl.
CPC ............ *G06V 10/141* (2022.01); *G06V 20/56* (2022.01); *H04N 5/2351* (2013.01); *H04N 7/18* (2013.01); *B60Q 1/04* (2013.01)

(58) Field of Classification Search
CPC .... B60Q 2300/47; B60Q 1/1423; B60Q 1/24; B60Q 1/18; B60Q 2300/314; B60R 11/04; G06V 10/141; G06V 20/56; G08G 1/166; G01S 19/48; G01S 13/86; G01C 21/165; G01C 11/02; G01C 21/3415
USPC ......................................................... 348/148
See application file for complete search history.

(56) References Cited

U.S. PATENT DOCUMENTS

| | | | |
|---|---|---|---|
| 2007/0021915 A1* | 1/2007 | Breed | G08G 1/166 |
| | | | 701/301 |
| 2017/0043720 A1* | 2/2017 | Shaw | G06V 20/58 |
| 2018/0334099 A1 | 11/2018 | Gao et al. | |
| 2020/0226377 A1* | 7/2020 | Campos Macias | G06K 9/6256 |
| 2020/0406926 A1* | 12/2020 | Jiang | B60W 60/0015 |
| 2021/0213869 A1* | 7/2021 | Martin | F21S 41/62 |
| 2021/0213870 A1* | 7/2021 | Martin | B60Q 1/143 |
| 2022/0169260 A1* | 6/2022 | Strobel | B60G 17/0165 |

FOREIGN PATENT DOCUMENTS

| | | |
|---|---|---|
| DE | 102015009875 A1 | 3/2016 |
| DE | 102018212506 A1 | 1/2020 |
| DE | 102018130909 A1 | 6/2020 |
| EP | 3650271 A1 | 5/2020 |
| FR | 3046393 A1 | 7/2017 |

* cited by examiner

VEHICLE SURROUNDINGS OBJECT DETECTION IN LOW LIGHT CONDITIONS

TECHNICAL FIELD

The present disclosure relates to supporting in low light conditions in surroundings of a vehicle, object detection by at least a first on-board rearward- and/or sideward-facing image capturing device.

BACKGROUND

An increasing number of modern vehicles have advanced driver-assistance systems, ADAS, to increase vehicle safety and more generally road safety. ADAS—which for instance may be represented by lane departure avoidance, adaptive cruise control, ACC, collision avoidance system, forward collision warning, etc.—are electronic systems that may aid a vehicle driver while driving. To function as intended, ADAS may rely on inputs from multiple data sources, such as e.g. LIDARs, radars, ultrasonics, cameras, automotive imaging, image processing, computer vision, and/or in-car networking.

Moreover, in a not too distant future, autonomous or automated driving systems, AD systems, will to greater extent find their way into modern vehicles. An AD system is a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An AD system commonly combines a variety of sensors to perceive the vehicle's surroundings, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

In order to localize an ADAS or AD supporting vehicle with high precision in a digital map, such as a high definition, HD, map, information about lane markings and other objects detected by forward, rearward and/or side facing cameras onboard the vehicle, may be matched with information in the digital map.

In low light conditions, however, although forward facing cameras may be assumed to work well as the road in front may be lit by the vehicle's headlights, object detection by rearward and/or side facing cameras may suffer. The lack of light may cause a reduced or lost performance with respect to object detection, e.g. lane marking detection, with the consequence of reduced availability of—and/or negative impact on—functionality of the ADAS or AD system.

SUMMARY

It is therefore an object of embodiments herein to provide an approach for in an improved and/or alternative manner support object detection in surroundings rearward and/or sideward of a moving vehicle, in low light conditions.

The object above may be achieved by the subject-matter disclosed herein. Embodiments are set forth in the appended claims, in the following description and in the drawings.

The disclosed subject-matter relates to a method performed by a vision control system for supporting in low light conditions in surroundings of a moving vehicle, object detection by at least a first on-board rearward- and/or sideward-facing image capturing device. The vision control system captures a surrounding located rearward and/or sideward of the moving vehicle with support from the at least first image capturing device. The vision control system further determines light conditions in the surrounding. Moreover, the vision control system provides with support from at least a first light source, when the light conditions fulfill insufficient light criteria, a light output illuminating a ground region of the surrounding to facilitate object detection by the at least first image capturing device.

The disclosed subject-matter further relates to a vision control system for—and/or adapted for—supporting in low light conditions in surroundings of a moving vehicle, object detection by at least a first on-board rearward- and/or sideward-facing image capturing device. The vision control system comprises a surrounding capturing unit for—and/or adapted for—capturing a surrounding located rearward and/or sideward of the moving vehicle with support from the at least first image capturing device. The vision control system further comprises a light conditions determining unit for—and/or adapted for—determining light conditions in the surrounding. Moreover, the vision control system comprises a light output providing unit for—and/or adapted for—providing with support from at least a first light source, when the light conditions fulfill insufficient light criteria, a light output illuminating a ground region of the surrounding to facilitate object detection by the at least first image capturing device.

Furthermore, the disclosed subject-matter relates to a vehicle comprising a vision control system as described herein.

Moreover, the disclosed subject-matter relates to a computer program product comprising a computer program containing computer program code means arranged to cause a computer or a processor to execute the steps of a vision control system described herein, stored on a computer-readable medium or a carrier wave.

The disclosed subject-matter further relates to a non-volatile computer readable storage medium having stored thereon the computer program product.

Thereby, there is introduced an approach enabling enhanced detection by one or more image capturing devices on-board a moving vehicle of objects sideward and/or rearward of the vehicle, during inadequate and/or insufficient light conditions. That is, since there is captured a surrounding located rearward and/or sideward of the moving vehicle with support from at least a first on-board rearward- and/or sideward-facing image capturing device, there is obtained from the image capturing device(s) one or more images and/or image data covering and/or revealing a vehicle surrounding behind and/or in a sideward direction of the moving vehicle. Moreover, that is, since there is determined light conditions in the surrounding, e.g. from the images and/or image data, there are established circumstances in terms of light—such as ambient light—valid for the surrounding in question, which light in turn may affect the image capturing device(s)' ability to detect objects in the surrounding. Furthermore, that is, since there is provided with support from at least a first light source, when the light conditions fulfill insufficient light criteria, a light output illuminating a ground region of the surrounding to facilitate object detection by the at least first image capturing device, additional light is emitted illuminating at least a portion of a ground area and/or zone thereof provided that the light conditions are established to be inadequate for object detection in the surrounding rearward and/or sideward of the moving vehicle. Thus, with the additional provided light lighting up at least a portion of the ground in the surrounding, the image capturing device(s)' ability to detect object(s) in the surrounding rearward and/or sideward of the vehicle, is enhanced.

For that reason, an approach is provided for in an improved and/or alternative manner support object detection in surroundings rearward and/or sideward of a moving vehicle, in low light conditions.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting in low light conditions in surroundings of a moving vehicle, object detection by at least a first on-board rearward- and/or sideward-facing image capturing device, there will be disclosed an approach enabling enhanced detection by the image capturing device(s) of objects sideward and/or rearward of the moving vehicle during inadequate and/or insufficient light conditions.

Figure 1:
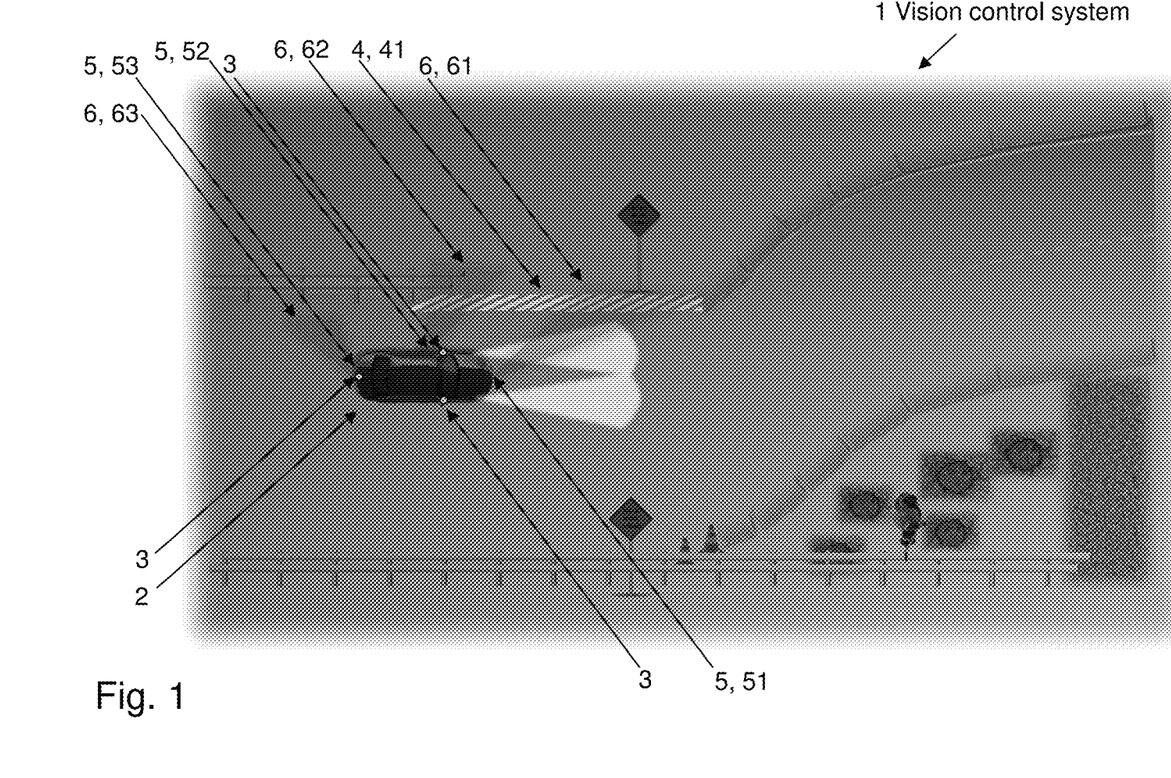
FIG. 1 illustrates a schematic view of an exemplifying vision control system according to embodiments of the disclosure.
Figure 2:
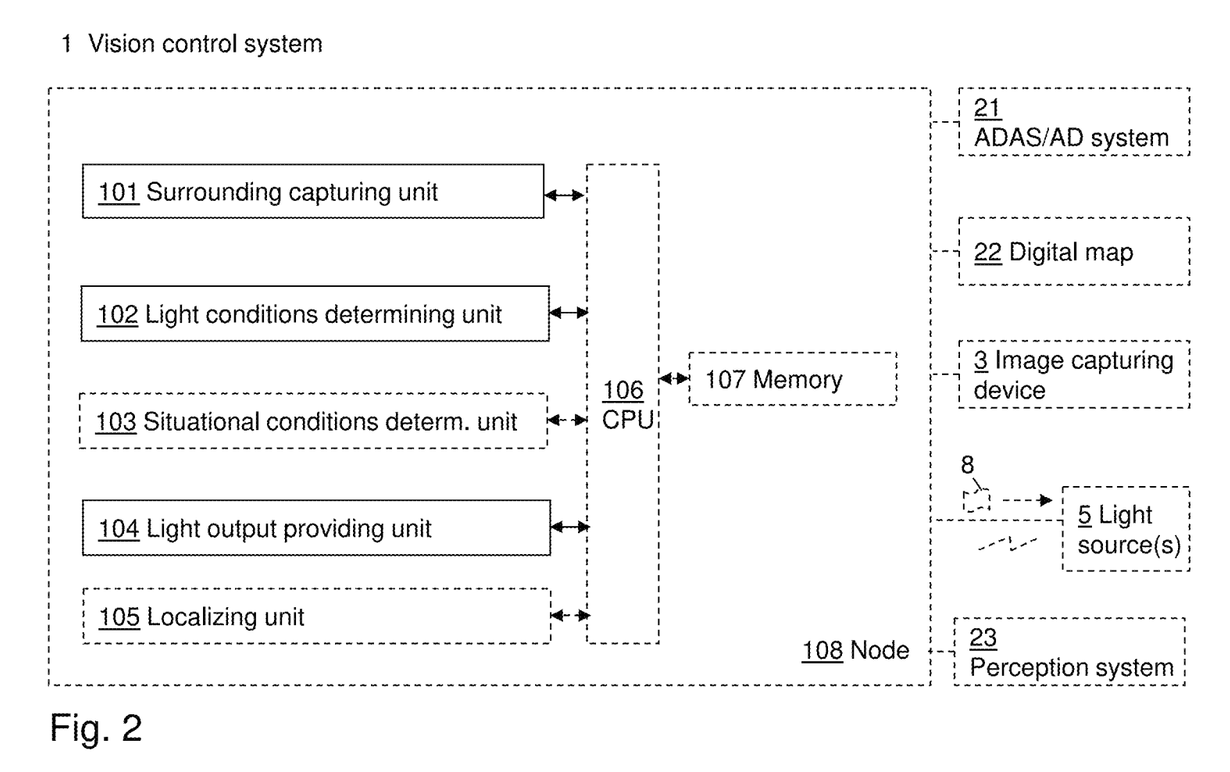
FIG. 2 is a schematic block diagram illustrating an exemplifying vision control system according to embodiments of the disclosure.

Referring now to the figures, there is depicted in FIG. 1 a schematic view of an exemplifying vision control system 1 according to embodiments of the disclosure, and in FIG. 2 a schematic block diagram illustrating an exemplifying vision control system 1 according to embodiments of the disclosure.

The vision control system 1 may be comprised or at least partly comprised in a vehicle 2. The vehicle 2 comprises, is equipped with and/or has on-board at least a first on-board rearward- and/or sideward-facing image capturing device 3. The one or more image capturing devices 3—which may be distributed in any arbitrary feasible manner—may be represented by any—e.g. known—sensors, functionality and/or systems adapted to capture images of vehicle surroundings, for instance in the visible wavelength range, for instance represented by one or more cameras.

The exemplifying vehicle 2 may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle". The vehicle 2 may thus comprise, and/or be adapted to support an ADAS and/or AD system 21, i.e. an advanced driver-assistance system and/or an automated driving system. Such an ADAS and/or AD system 21 may refer to any arbitrary ADAS and/or AD system, e.g. known in the art and/or yet to be developed. The vehicle 2 and/or the ADAS or AD system 21 may comprise, be provided with and/or have on-board an optional perception system 23 and/or similar system and/or functionality adapted to estimate surroundings of the vehicle 2, and subsequently adapted to estimate world views of the surroundings e.g. with support from a—e.g. commonly known—digital map 22 such as a high definition, HD, map, and/or an equivalent and/or successor thereof. Such an exemplifying perception system 23 or similar system may refer to any commonly known system and/or functionality, e.g. comprised in one or more electronic control modules, ECUs, and/or nodes of the vehicle 2 and/or the ADAS or AD system 21, adapted and/or configured to interpret sensory information—relevant for driving of the vehicle 2—to identify e.g. obstacles, vehicle lanes, relevant signage, appropriate navigation paths etc. The exemplifying perception system 23 or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided on-board the vehicle 2 adapted to sense and/or perceive the vehicle's 2 whereabouts and/or surroundings, for instance represented by one or a combination of one or more of a positioning system, odometer, inertial measurement units, radar, lidar, ultrasonics, surrounding detecting sensors and/or the one or more image capturing devices 3.

The phrase "vision control system" may refer to "vision enhancement system", "illumination providing system", "object detection supporting system", "localization enhancement system" and/or merely "control system", and further according to an example to "vision control system of a vehicle". "For supporting [ . . . ] object detection", on the other hand, may refer to "adapted for supporting [ . . . ] object detection" and/or "for enhancing and/or enabling [ . . . ] object detection", whereas "object detection" may refer to "enhanced object detection". Moreover, the phrase "in low light conditions" may refer to "in inadequate and/or insufficient light conditions", "in light conditions inadequate for sufficient object detection" and/or "in light conditions below a predeterminable threshold", whereas "in surroundings of a moving vehicle" may refer to "within sensor range of a moving vehicle" and/or "within a predeterminable distance from a moving vehicle". Moreover, "moving vehicle" may according to an example refer to merely "vehicle". The phrase "by at least a first on-board rearward- and/or sideward-facing image capturing device", on the other hand, may refer to "by at least a first on-board essentially rearward- and/or sideward-facing image capturing device" and/or "by at least a first image capturing device on-board the vehicle directed rearward in a lengthwise direction—and/or sideward in a transversal direction—of the vehicle". According to an example, the phrase "by at least a first on-board rearward- and/or sideward-facing image capturing device" may further refer to "by at least a first on-board rearward and/or sideward-facing image capturing device for mapping of the moving vehicle to a digital map at least partly based on the object detection", "by at least a first on-board rearward and/or sideward-facing image capturing device, to enable localizing the moving vehicle in view of a digital map at least partly based on the object detection" and/or "by at least a first on-board rearward and/or sideward-facing image capturing device associated with an advanced driver assistance system, ADAS, or autonomous driving, AD, system of the vehicle". Moreover, according to an example, the phrase "for supporting in low light conditions in surroundings of a moving vehicle, object detection by at least a first on-board rearward- and/or sideward-facing image capturing device" may refer to "for supporting, enhancing and/or enabling object detection in surroundings rearward and/or sideward of a moving vehicle, in low light conditions".

The vision control system 1 is—e.g. by means of a surrounding capturing unit 101—adapted and/or configured for capturing a surrounding located rearward and/or sideward of the moving vehicle 2 with support from the at least first image capturing device 3. Thereby, there is obtained from the one or more image capturing devices 3 on-board the vehicle 2, one or more images and/or image data covering and/or revealing a vehicle surrounding behind and/or in a sideward direction of the moving vehicle 2.

The surrounding captured by the image capturing device (s) 3 may be represented by and/or correspond to any arbitrary feasible geographical zone of any arbitrary feasible size and/or dimensions in vicinity of the vehicle 2 in a sideward and/or rearward direction thereof, within range and/or field of view of the image capturing device(s) 3. Potential objects (4) in the surrounding may be represented by any feasible objects, for instance static and/or dynamic objects, such as other road users, buildings, structures, road markings, lane markings, etc. In exemplifying FIG. 1, an object 4 represented by a portion of an exemplifying barrier 41 located essentially sideward of the vehicle 2, is comprised in the surrounding.

The phrase "capturing a surrounding" may refer to "obtaining a surrounding", and according to an example further to "capturing image data of a surrounding" and/or "capturing image data from one or more images of a surrounding". Moreover, "a surrounding located rearward and/or sideward of the moving vehicle" may refer to "a surrounding located essentially rearward and/or sideward of the moving vehicle", "a surrounding located behind the moving vehicle in a lengthwise direction thereof and/or sideward the moving vehicle in a transversal direction thereof" and/or merely "a surrounding rearward and/or sideward of the moving vehicle". "Surrounding", on the other hand, may refer to "vehicle surrounding" and/or "geographical zone", whereas the phrase "with support from the at least first image capturing device" may refer to "by means of and/or utilizing the at least first image capturing device".

Furthermore, the vision control system 1 is—e.g. by means of a light conditions determining unit 102—adapted and/or configured for determining light conditions in the surrounding. Thereby, there are established circumstances in terms of light—such as ambient light—valid for the surrounding in question, which light in turn may affect the image capturing device(s)' 3 ability to detect objects 4 in the surrounding. In exemplifying FIG. 1, the light conditions are relatively dark, such as representing e.g. night time and/or dusk.

The prevailing light conditions for the surrounding and/or one or more parameters and/or properties of the light conditions, e.g. brightness and/or intensity, may be determined and/or estimated in any arbitrary feasible—e.g. known—manner, such as with support from commonly known light measuring sensors and/or systems. Additionally or alternatively, the light conditions may be determined based on image data of the surrounding captured by the at least first image capturing device 3. Thereby, by processing and/or analyzing image data such as e.g. luminance from one or more images of the surrounding and/or a portion thereof captured by the image capturing device(s) 3, prevailing light conditions for the surrounding may be accurately established and/or derived.

The phrase "determining light conditions in the surrounding" may refer to "deriving light conditions in the surrounding", "estimating light conditions in the surrounding", "determining prevailing light conditions in the surrounding", "deriving light conditions valid for the surrounding" and/or "determining light conditions prevailing in at least a portion of the surrounding". Moreover, "the surrounding" may throughout the disclosure refer to "the captured surrounding". The phrase "light conditions", on the other hand, may refer to "a light conditions value" and according to an example further to "ambient light conditions" and/or "ambient light".

Moreover, the vision control system 1 is—e.g. by means of a light output providing unit 104—adapted and/or configured for providing with support from at least a first light source 5, when the light conditions fulfill insufficient light criteria, a light output illuminating a ground region 6 of the surrounding to facilitate object detection by the at least first image capturing device 3. Thereby, provided that the light conditions are established to be inadequate for object detection in the surrounding rearward and/or sideward of the moving vehicle 2, as illustrated in exemplifying FIG. 1, additional light is emitted illuminating at least a portion of a ground area and/or zone 6 thereof. Thus, with the additional provided light lighting up at least a portion of the ground 6 in the surrounding, the image capturing device(s)' 3 ability to detect object(s) 4—such as the exemplifying barrier 41 of FIG. 1—in the surrounding rearward and/or sideward of the vehicle 2, is enhanced.

The light output may be provided in any feasible manner, and correspondingly, the one or more light sources 5 may be represented by any arbitrary feasible light source(s) enabling illumination of the ground region 6. For instance, the one or more light sources 5 may be represented by—e.g. known—LEDs and/or bulbs and/or any equivalents and/or successors thereof. The light output may involve light emission from the one and potentially more light sources 5 one at a time, simultaneously, in combination, in series etc., and may further be represented by e.g. steady light, pulsating light, light of varying wavelength, brightness, intensity and/or colour etc. Moreover, the one or more light sources 5 may be distributed and/or directed in any feasible manner enabling the ground region 6 to be illuminated, for instance in a manner avoiding disturbing and/or blinding surrounding road users. The one or more light sources 5 may accordingly be positioned relatively low and/or directed and/or delimited such that light provided therefrom is limited by a predeterminable maximum angle from a vertical direction, for instance by a maximum of sixty degrees, forty-five degrees and/or thirty degrees from a vertical direction. Optionally, as illustrated in exemplifying FIG. 1, at least a first light source 5 may be comprised in—and/or provided on-board—the vehicle 2, for instance underneath and/or in a lower portion of the vehicle 2. The light source(s) 5 may hence e.g. be placed on the underside of the vehicle 2—and/or essentially on the underside and/or along an exterior of the vehicle 2 within a predeterminable vertical distance from the underside such as e.g. within 0.3 meters, 0.2 meters and/or 0.1 meters thereof—thus enabling for providing the light output illuminating the ground region 6 meanwhile avoiding disturbing and/or blinding surrounding road users. In exemplifying FIG. 1, the one or more light sources 5 are in an exemplifying manner represented by three light sources 51, 52, 53 illuminating a first ground region 61, a second ground region 62 and a third ground region 63, respectively.

The illuminated ground region 6 may be set, shaped and/or restricted to any arbitrary feasible size and/or dimensions, for instance comprising plural e.g. separated sub-regions, and may further be represented by e.g. one or several essentially ovals or circles, for instance ranging from less than a meter across up to tens of meters across. The ground region 6 may further extend beyond the surrounding and/or make up a portion thereof. Furthermore, the ground region 6 may move its position geographically along with movement of the vehicle 2, for instance in such a manner that the position of the ground region 4 is fixed relative the vehicle 2.

The insufficient light criteria may be represented by any feasible criteria representing insufficient light conditions for object detection in the captured surrounding. The insufficient light criteria may accordingly be represented by at least one criterion e.g. threshold stipulating under what circumstances and/or at which level(s) light conditions—such as ambient light conditions—are deemed insufficient for object detection in the surrounding, such as for instance during dusk and/or night time. A duration of the light output, on the other hand, may be of any feasible time range, e.g. ranging from a few milliseconds up to several minutes or even hours. Additionally or alternatively, provision of the light output may end with establishment of that determined light conditions for a captured surrounding no longer fulfill insufficient light criteria.

The phrase "providing [ . . . ] a light output illuminating a ground region" may refer to "emitting, communicating, signaling, conveying and/or initiating [ . . . ] a light output illuminating a ground region", "providing continuously and/or intermittently [ . . . ] a light output illuminating a ground region" and/or "illuminating [ . . . ] a ground region", and according to an example further to "providing within the visible wavelength range [ . . . ] a light output illuminating a ground region" and/or "providing [ . . . ] a visual light output illuminating a ground region". Moreover, "a ground region" may refer to "at least a first ground region" and/or "a ground region comprising one or more sub-regions", whereas "illuminating a ground region" may refer to "at least partially and/or to some extent illuminating a ground region". The phrase "a ground region of the surrounding", on the other hand, may refer to "a ground region at least partly comprised in the surrounding" and/or "a ground region at least partly coinciding with the surrounding". According to an example, the phrase "a light output illuminating a ground region of the surrounding" may refer to "a light output illuminating a ground region of the surrounding located within a predeterminable sideways distance from the vehicle". Such a predeterminable sideways i.e. transversal distance may for instance be represented by 25 meters, 15 meters and/or 5 meters. Furthermore, the phrase "to facilitate object detection by the at least first image capturing device" may refer to "to support, enhance, improve and/or enable object detection by the at least first image capturing device", and according to an example further to ", the light output facilitating object detection by the at least first image capturing device". Moreover, the phrase "with support from at least a first light source" may refer to "by means of and/or utilizing at least a first light source", whereas "light source" may refer to "light source adapted to emit light" and further according to an example to "light source adapted to emit visual light" and/or "light source adapted to emit light within the visual range". The phrase "when the light conditions fulfill insufficient light criteria" may refer to "should, if and/or provided that the light conditions fulfill insufficient light criteria", whereas "insufficient light criteria" may refer to "one or more insufficient light thresholds", "predeterminable insufficient light criteria" and/or "light criteria representing insufficient light conditions for object detection in the surrounding" and/or "light criteria representing insufficient light conditions for sufficient and/or satisfying object detection in the surrounding". Moreover, according to an example, "insufficient light criteria" may refer to "insufficient ambient light criteria".

Optionally, the vision control system 1 may—e.g. by means of an optional localizing unit 105—be adapted and/or configured for localizing, when the light output is provided, the vehicle 2 in view of a digital map 22, at least partly based on detected object(s) 4 in the ground region 6 captured with support from the at least first image capturing device 3. Thereby, with the additional provided light lighting up at least a portion of the ground 6 in the surrounding, and subsequently the image capturing device(s)'s 3 improved ability to detect object(s) 4—such as the exemplifying barrier 41 of FIG. 1—in the surrounding rearward and/or sideward of the vehicle 2, enhanced mapping i.e. localization of the vehicle 2 to a digital map 22 is supported. Subsequently, reduced and/or lost performance with respect to object detection rearward and/or sideward of the vehicle 2—e.g. lane marking detection—caused by lack of light, with the consequence of reduced availability and/or negative impact on functionality of a potential ADAS or AD system 21 of the vehicle 2, may be avoided.

Localizing the vehicle 2 in view of the digital map 22 at least in part based on the detected object(s) 4 may be accomplished in any feasible—e.g. known—manner, e.g. as described in conjunction with the exemplifying optional perception system 23 mentioned above. Accordingly, localizing of the vehicle 2 in view of the digital map 21, may hence—in addition to being based on detected objects 4 in the ground region 6 captured with support from the one or more image capturing devices 3—additionally be based on other sensory information. The phrase "when the light output is provided" may refer to "subsequent the providing of the light source", whereas "localizing [ . . . ] the vehicle in view of a digital map" may refer to "mapping [ . . . ] the vehicle to a digital map". Moreover, "at least partly based on detected object(s) in the ground region" may according to an example refer merely to "based on detected object(s) in the ground region". "Digital map", on the other hand, may according to an example refer to "high definition, HD, map and/or an equivalent or successor thereof".

Further optionally, one or more characteristics of the light output may be based on the light conditions. Thereby, properties and/or attributes of the light output may depend on the light conditions—and/or characteristics thereof—determined to be valid in the captured surrounding. Thus, the light output may vary with varying light conditions and accordingly be adapted in a suitable and/or preferred manner, such as e.g. be provided with lower brightness and/or intensity—and/or greater ground region 6 dimensions—during night time light conditions than during dusk light conditions. The phrase "one or more characteristics which are based on the light conditions" may refer to "one or more properties and/or attributes which are based on the light conditions", and further to "one or more characteristics which depend on the light conditions" and/or "one or more characteristics varying with varying light conditions". Moreover, "based on the light conditions" may refer to "based on characteristics, properties and/or attributes of the light conditions".

Moreover optionally, the vision control system 1 may—e.g. by means of an optional situational conditions determining unit 103—be adapted and/or configured for determining situational conditions, for instance comprising object detection conditions, vehicle localization conditions and/or surrounding road users conditions. Providing the light output may then comprise providing the light output when the light conditions fulfill insufficient light criteria and when the situational conditions fulfill light provision eligibility criteria. Thereby, there are derived prevailing circumstances relating to e.g. confidence and/or criticality of object detection and/or localizing the vehicle 2 in view of the digital map 22, and/or relating to one or more detected other road users, which in turn may factor in on how relevant and/or unsuitable provision of the light output may be considered to be. Accordingly, here, the light output is only provided should the situational conditions fulfill the light provision eligibility criteria in addition to the light conditions fulfilling the insufficient light criteria. Consequently, consideration is given to situational circumstances for instance confidence and/or criticality of object detection and/or vehicle localization of view of the digital map 22—which may insinuate importance of enhanced object detection and subsequently importance of providing the light output in the surrounding—and/or for instance other road user(s) in vicinity of the vehicle 2—which may insinuate unsuitability of providing the light output e.g. due to risk of disturbing and/or blinding the other road user(s).

The situational conditions may be derived from any feasible system and/or functionality such as e.g. from—and/or in association with—the exemplifying optional perception system 23 discussed above and/or commonly known surrounding detecting sensors. Additionally or alternatively, the situational conditions may be determined by the vision control system 1. Moreover, the situational conditions may be represented by any conditions deemed to factor in on the relevance and/or unsuitability of providing the light output. The light provision eligibility criteria, on the other hand, may be represented by any feasible criteria representing eligibility conditions for enhanced object detection in the surrounding. The light provision eligibility criteria may accordingly be represented by at least one criterion e.g. threshold stipulating under what circumstances and/or at which level(s) situational conditions—such as for instance object detection conditions, vehicle localization conditions and/or surrounding road users conditions as described above—are deemed eligible for light output provision. For instance, the light provision eligibility criteria may comprise one or more of an object detection confidence threshold, object detection criticality threshold, vehicle localization confidence threshold, vehicle localization criticality threshold, surrounding road user(s) distance threshold, type of surrounding road user(s), number of surrounding road user(s), etc. Accordingly, the light output may for instance be provided when—in addition to the light conditions fulfilling the insufficient light criteria—object detection and/or vehicle localization confidence is relatively low such as below a confidence threshold and/or object detection and/or vehicle localization criticality is relatively high such as exceeding a criticality threshold, and/or not provided when a detected surrounding road user is relatively close to the vehicle 2 such as closer than a minimum distance threshold.

The phrase "determining situational conditions" may refer to "deriving situational conditions", "estimating situational conditions" and/or "determining prevailing situational conditions". Moreover, "situational conditions" may refer to "a situational conditions value" and according to an example further to "situational conditions comprising object detection conditions, vehicle localization conditions and/or surrounding road users conditions". The phrase "when the light conditions fulfill insufficient light criteria and when the situational conditions fulfil light provision eligibility criteria", on the other hand, may refer to "should, if and/or provided that the light conditions fulfill insufficient light criteria and should, if and/or provided that the situational conditions fulfil light provision eligibility criteria". Furthermore, "light provision eligibility criteria" may refer to "one or more light provision eligibility thresholds", "predeterminable light provision eligibility criteria" and/or "light provision eligibility criteria representing eligibility conditions for enhanced object detection in the surrounding". Moreover, according to an example, "light provision eligibility criteria" may further refer to "object detection confidence and/or criticality criteria, vehicle localization confidence and/or criticality criteria, and/or surrounding road users criteria".

Moreover optionally, one or more characteristics of the light output may—additionally or alternatively to being based on the light conditions—be based on the situational conditions. Thereby, properties and/or attributes of the light output may depend on the determined prevailing optional situational conditions and/or characteristics thereof. Thus, the light output may vary with varying situational conditions and accordingly be adapted in a suitable and/or preferred manner, such as e.g. be provided with higher e.g. brightness and/or intensity and/or greater ground region 6 dimensions e.g. during relatively low object detection and/or vehicle localization confidence and/or relatively high object detection and/or vehicle localization criticality, and/or provided with lower e.g. brightness and/or intensity and/or smaller ground region 6 dimensions e.g. during detected presence of surrounding road user(s). The phrase "one or more characteristics which are based on the situational conditions" may refer to "one or more properties and/or attributes which are based on the situational conditions", and further to "one or more characteristics which depend on the situational conditions" and/or "one or more characteristics varying with varying situational conditions". Moreover, "based on the situational conditions" may refer to "based on characteristics, properties and/or attributes of the situational conditions".

As further shown in FIG. 2, the vision control system 1 comprises a surrounding capturing unit 101, a light conditions determining unit 102, an optional situational conditions determining unit 103, a light output providing unit 104 and an optional localizing unit 105, all of which already have been described in greater detail above. Furthermore, the embodiments herein for supporting in low light conditions in surroundings of a moving vehicle 2, object detection by at least a first on-board rearward- and/or sideward-facing image capturing device 3, may be implemented through one or more processors, such as a processor 106, here denoted CPU, together with computer program code for performing the functions and actions of the embodiments herein. the program code may also be provided as a computer program product, for instance in the form of a data carrier carrying computer program code for performing the embodiments herein when being loaded into the vision control system 1. One such carrier may be in the form of a CD ROM disc and/or a hard drive, it is however feasible with other data carriers. The computer program code may furthermore be provided as pure program code on a server and downloaded to the vision control system 1. The vision control system 1 may further comprise a memory 107 comprising one or more memory units. The memory 107 may be arranged to be used to store e.g. information, and further to store data, configurations, schedulings, and applications, to perform the methods herein when being executed in the vision control system 1. For instance, the computer program code may be implemented in the firmware, stored in FLASH memory 107, of an embedded processor 106, and/or downloaded wirelessly e.g. from an off-board server. Furthermore, the surrounding capturing unit 101, the light conditions determining unit 102, the optional situational conditions determining unit 103, the light output providing unit 104, optional localizing unit 105, the optional processor 106 and/or the optional memory 107, may at least partly be comprised in one or more nodes 108 e.g. ECUs of the vehicle 2, e.g. in and/or in association with the optional ADAS or ADS system 21. Those skilled in the art will also appreciate that the units 101-105 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 107, that when executed by the one or more processors such as the processor 106 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

In addition to the already described digital map 22, image capturing device(s) 3, light source(s) 5 and perception system 23, FIG. 2 depicts an optional request signal 8, which will be described in greater detail in the following in conjunction with FIGS. 3*a-b*.

Figure 3A:
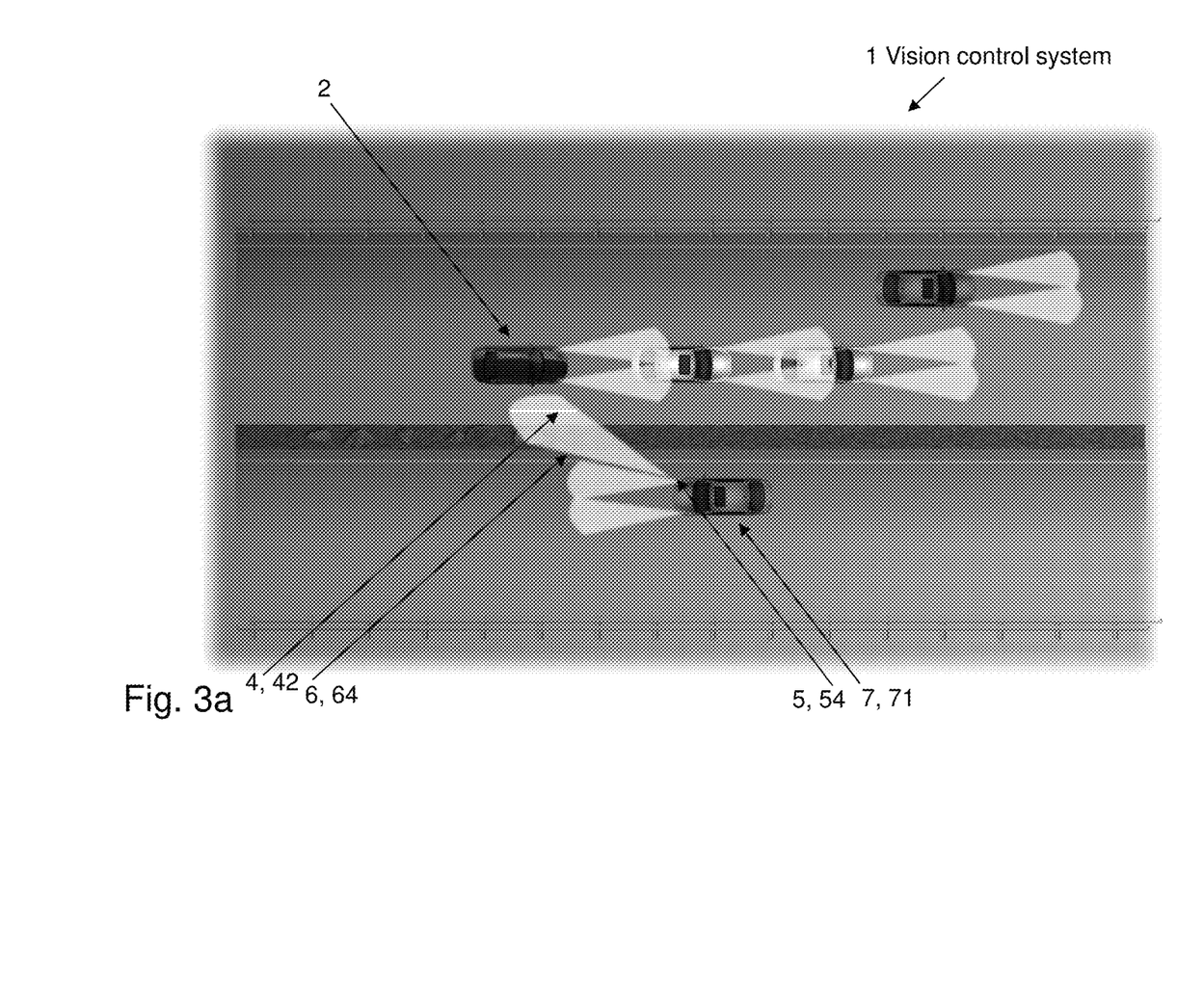
FIGS. 3a-b illustrate schematic views of exemplifying vision control systems according to embodiments of the disclosure.
Figure 3B:
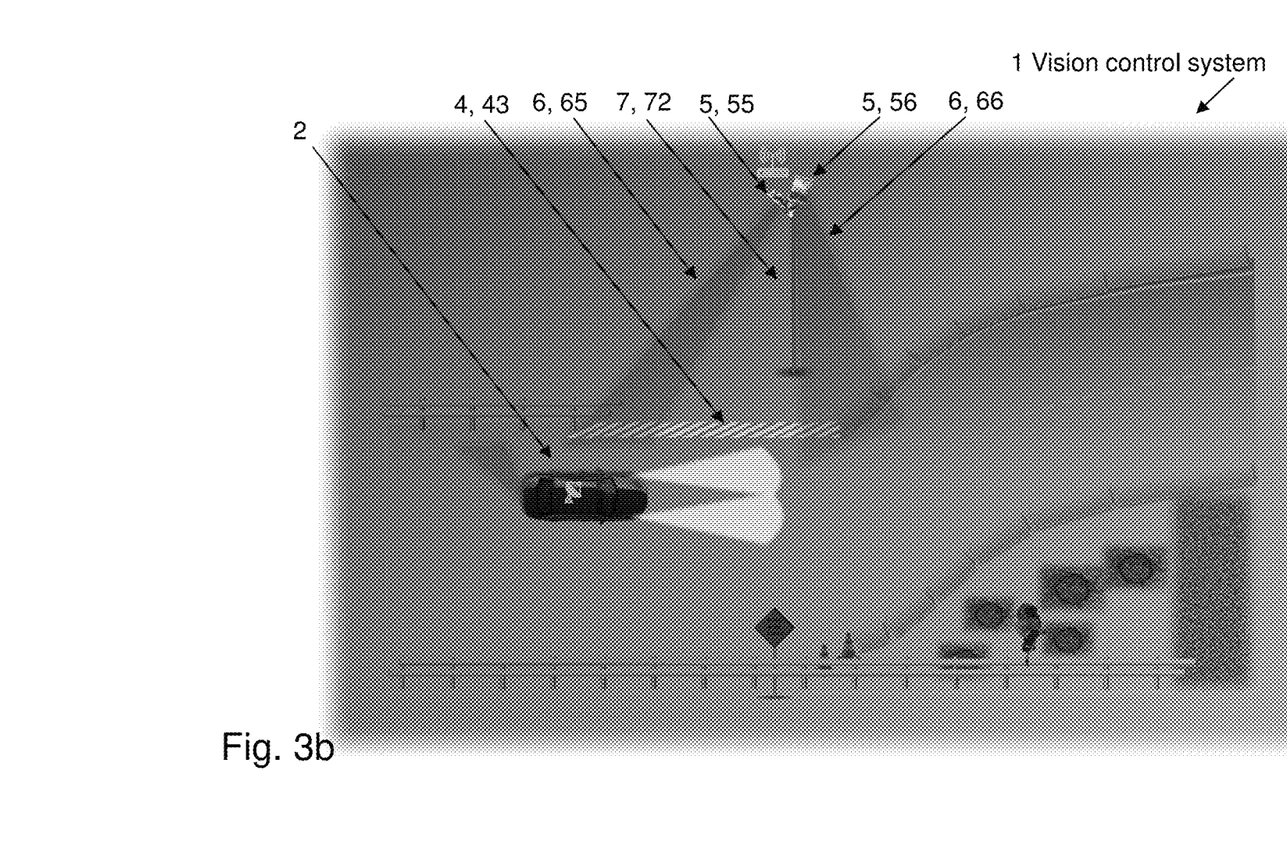

Further optionally, as exemplified in FIGS. 3*a-b* which illustrate schematic views of exemplifying vision control systems 1 according to embodiments of the disclosure, at least a first light source 5, 54, 55, 56 may be comprised in an entity 7 positioned within a predeterminable distance from the vehicle 2, for instance as exemplified in FIG. 3*a* in a secondary vehicle 71 and/or as exemplified in FIG. 3*b* in a piece of infrastructure 72. Providing the light output may then comprise providing the light output based on a, to the entity 7 communicated, request signal 8 indicative of the surrounding. Thereby, rather than—or in addition to—being provided with support from one or more light sources 51, 52, 53 on-board the vehicle 2 as shown in FIG. 1, the light output illuminating a ground region 6, 64, 65, 66 of the captured surrounding rearward and/or sideward of the vehicle 2, may be provided with support from one or more light sources 54, 55, 56 comprised in an entity 7 in vicinity of the vehicle 2. In exemplifying FIG. 3*a*, an object 4 represented by a portion of an exemplifying road marking 42 located essentially sideward of the vehicle 2, is comprised in the surrounding, whereas in exemplifying FIG. 3*b*, an object 4 represented by a portion of a barrier 43 located essentially sideward of the vehicle 2, is comprised in the surrounding.

The entity 7 may refer to any dynamic or stationary structure or object feasible for comprising, being equipped with and/or having on-board one or more light sources 54, 55, 56, adapted for providing the light output illuminating the ground region 64, 65, 66 based on a received request signal 8 indicating the captured surrounding. The entity 7 may accordingly be represented by for instance a secondary vehicle 71, which secondary vehicle 71 may be represented by any arbitrary manned or unmanned vehicle, for instance an engine-propelled or electrically-powered vehicle such as a car, truck, lorry, van, bus and/or tractor, e.g. travelling in the same or opposite driving direction as the vehicle 2. Additionally or alternatively, the entity 7 may accordingly be represented by for instance a piece of infrastructure 72 such as a stationary structure, positioned in vicinity of a road and/or road network. Should at least a first light source 54 be comprised in a secondary vehicle 71, then the at least first light source 54 may be represented by commonly known LED matrix front head lights of the secondary vehicle 71, from which the light output may be provided. Additionally or alternatively, the at least first light source 54 may for instance be comprised—and/or provided—underneath and/or in a lower portion of the secondary vehicle 71, such as be placed on the underside of the secondary vehicle 71—and/or essentially on the underside and/or along an exterior of the secondary vehicle 71 within a predeterminable vertical distance from the underside such as e.g. within 0.3 meters, 0.2 meters and/or 0.1 meters thereof—thus enabling for providing the light output illuminating the ground region 64, 65, 66 meanwhile avoiding disturbing and/or blinding surrounding road users. Should on the other hand at least a first light source 55, 56 be comprised in a piece of infrastructure 72, then the at least first light source 55, 56 may be provided at any feasible height and/or at any feasible distance from a road along which the vehicle 2 potentially may be travelling. The predeterminable distance from the vehicle 2 within which the entity 7 needs to be positioned, may be represented by any feasible distance, such as for instance a distance from which the ground region 64, 65, 66 may be satisfyingly illuminated. Moreover, the request signal 8 indicative of the surrounding, may be communicated in any feasible wireless—e.g. known—manner, and further be of any feasible format which the entity 7—or a system and/or functionality associated therewith—may be able to interpret.

The phrase "for instance in a secondary vehicle and/or in a piece of infrastructure" may refer to "said entity comprising a secondary vehicle and/or a piece of infrastructure", whereas "communicated request signal" may refer to "digitally and/or wirelessly communicated request signal". Moreover, "request signal" may refer to "request message", whereas "request signal indicative of the surrounding" may refer to "request signal indicative of at least a portion of the surrounding" and/or "request signal comprising instructions and/or prompting the entity to with support from one or more of the at least first light source illuminating a ground region of and/or at least a portion of the surrounding".

It may be noted that the light output may be provided by one or more of the exemplifying light sources 51, 52, 53, 54, 55, 56 simultaneously.

Figure 4:
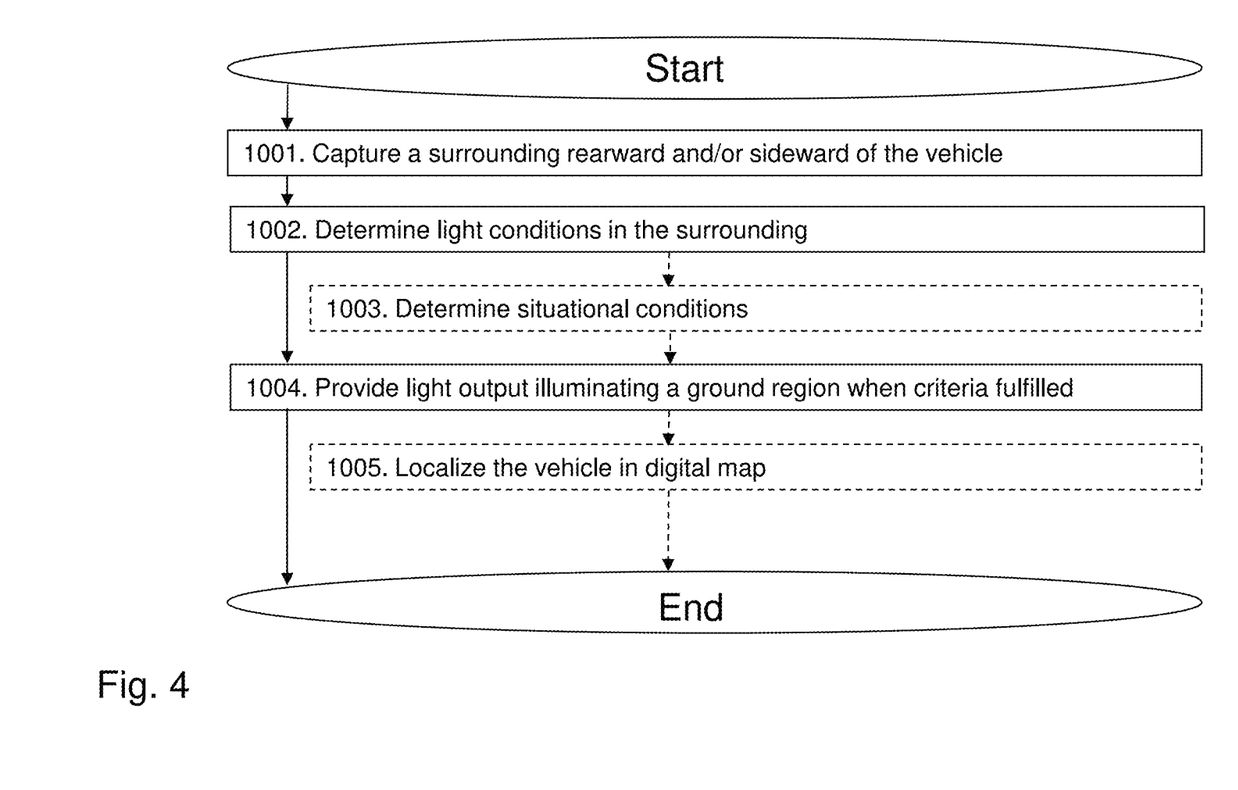
FIG. 4 is a flowchart depicting an exemplifying method performed by a vision control system according to embodiments of the disclosure.

FIG. 4 is a flowchart depicting an exemplifying method performed by a vision control system 1 according to embodiments of the disclosure. the method is for supporting in low light conditions in surroundings of a moving vehicle 2, object detection by at least a first on-board rearward- and/or sideward-facing image capturing device 3. The exemplifying method, which may be continuously repeated, comprises one or more of the following actions discussed with support from FIGS. 1-3. Moreover, the actions may be taken in any suitable order and/or one or more actions may be performed simultaneously and/or in alternate order where applicable. For instance, Action 1002 and optional Action 1003 may be performed simultaneously and/or in alternate order.

Action 1001

In Action 1001, the vision control system 1 captures—e.g. with support from the surrounding capturing unit 101—a surrounding located rearward and/or sideward of the moving vehicle 2 with support from the at least first image capturing device 3.

Action 1002

In Action 1002, the vision control system 1 determines— e.g. with support from the light conditions determining unit 102—light conditions in the surrounding.

Action 1003

In optional Action 1003, the vision control system 1 may determine—e.g. with support from the optional situational conditions determining unit 103—situational conditions, for instance comprising object detection conditions, vehicle localization conditions and/or surrounding road users conditions.

Action 1004

In Action 1004, the vision control system 1 provides— e.g. with support from the light output providing unit 104—with support from at least a first light source 5, when the light conditions fulfill insufficient light criteria, a light output illuminating a ground region 6 of the surrounding to facilitate object detection by the at least first image capturing device 3.

Optionally, should Action 1004 follow upon optional Action 1003 of determining situational conditions, then Action 1004 of providing a light output may comprise— and/or the light output providing unit 104 may be adapted and/or configured for—providing, when the light conditions fulfill insufficient light criteria and when the situational conditions fulfill light provision eligibility criteria, a light output illuminating a ground region 6 of the surrounding to facilitate object detection by the at least first image capturing device 3.

Further optionally, Action 1004 of providing a light output may comprise—and/or the light output providing unit 104 may be adapted and/or configured for—providing a light output having one or more characteristics which are based on the light conditions and/or the situational conditions.

Moreover optionally, Action 1004 of providing with support from at least a first light source 5 may comprise—and/or the light output providing unit 104 may be adapted and/or configured for—providing with support from at least a first light source 51, 52, 53 comprised in the vehicle 2, for instance underneath and/or in a lower portion of the vehicle 2.

Additionally or alternatively, optionally, Action 1004 of providing with support from at least a first light source 5 may comprise—and/or the light output providing unit 104 may be adapted and/or configured for—providing with support from at least a first light source 54, 55, 56 comprised in an entity 7 positioned within a predeterminable distance from the vehicle 2, for instance in a secondary vehicle 71 and/or in a piece of infrastructure 72. Action 1004 of providing a light output then comprises—and/or the light output providing unit 104 is then adapted and/or configured for—providing the light output based on a, to the entity 7 communicated, request signal 8 indicative of the surrounding.

Action 1005

In optional Action 1005, the vision control system 1 may localize—e.g. with support from the optional localizing unit 105—when the light output is provided, the vehicle in view of a digital map 22, at least partly based on detected object(s) 4 in the ground region 6 captured with support from the at least first image capturing device 3.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a vision control system for supporting in low light conditions in surroundings of a moving vehicle, object detection by at least one of a first on-board rearward and sideward-facing image capturing device, the method comprising:
   capturing a surrounding located at least one of rearward and sideward of the moving vehicle with support from the at least first image capturing device;
   determining light conditions in the surrounding; and
   providing, with support from at least a first light source, when the light conditions fulfil insufficient light criteria representing insufficient light conditions for object detection in the captured surrounding, a light output illuminating a ground region of the surrounding to facilitate object detection by the at least first image capturing device, the at least first light source being provided by an entity positioned within a predeterminable distance from the vehicle in one or both of a secondary vehicle and a piece of infrastructure, the light output being based on a request signal indicative of the captured surrounding communicated to the entity.

2. The method according to claim 1, further comprising:
   mapping, when the light output is provided, the vehicle to a digital map, at least partly based on detected object(s) in the ground region captured with support from the at least first image capturing device.

3. The method according to claim 2, further comprising:
   determining situational conditions, situational conditions comprising at least one of object detection conditions, vehicle localization conditions and surrounding road users' conditions; and
   wherein the providing a light output comprises providing, when the light conditions fulfil insufficient light criteria representing insufficient light conditions for object detection in the captured surrounding and when the situational conditions fulfil light provision eligibility criteria, a light output illuminating a ground region of the surrounding.

4. The method according to claim 3, wherein the providing a light output comprises providing a light output having one or more characteristics which are based on at least one of the light conditions and the situational conditions.

5. The method according to claim 2, wherein the providing a light output comprises providing a light output having one or more characteristics which are based on at least one of the light conditions and the situational conditions.

6. The method according to claim 1, further comprising:
determining situational conditions, situational conditions comprising at least one of object detection conditions, vehicle localization conditions and surrounding road users' conditions; and
wherein the providing a light output comprises providing, when the light conditions fulfil insufficient light criteria representing insufficient light conditions for object detection in the captured surrounding and when the situational conditions fulfil light provision eligibility criteria, a light output illuminating a ground region of the surrounding.

7. The method according to claim 1, wherein the providing a light output comprises providing a light output having one or more characteristics which are based on at least one of the light conditions and the situational conditions.

8. The method according to claim 1, wherein the providing with support from at least a first light source comprises providing with support from at least a first light source comprised at least one of underneath and in a lower portion of the vehicle.

9. A vision control system for supporting in low light conditions in surroundings of a moving vehicle, object detection by at least one of a first on-board rearward and sideward-facing image capturing device, the vision control system comprising:
a surrounding capturing unit configured to capture a surrounding located rearward and/or sideward of the moving vehicle with support from the at least first image capturing device;
a light conditions determining unit configured to determine light conditions in the surrounding; and
a light output providing unit configured to provide, with support from at least a first light source, when the light conditions fulfil insufficient light criteria representing insufficient light conditions for object detection in the captured surrounding, a light output illuminating a ground region of the surrounding to facilitate object detection by the at least first image capturing device, the at least first light source being provided by an entity positioned within a predeterminable distance from the vehicle in one or both of a secondary vehicle and a piece of infrastructure, the light output being based on a request signal indicative of the captured surrounding communicated to the entity.

10. The vision control system according to claim 9, further comprising:
a mapping unit configured to map, when the light output is provided, the vehicle to a digital map, at least partly based on detected object(s) in the ground region captured with support from the at least first image capturing device.

11. The vision control system according to claim 10, further comprising:
a situational conditions determining unit configured to determine situational conditions, situational conditions comprising at least one of object detection conditions, vehicle localization conditions and surrounding road users' conditions;
wherein the light output providing unit is configured to provide, when the light conditions fulfil insufficient light criteria representing insufficient light conditions for object detection in the captured surrounding and when the situational conditions fulfil light provision eligibility criteria, a light output illuminating a ground region of the surrounding.

12. The vision control system according to claim 10, wherein the light output providing unit is configured to provide a light output having one or more characteristics which are based on at least one of the light conditions and the situational conditions.

13. The vision control system according to claim 9, further comprising:
a situational conditions determining unit configured to determine situational conditions, situational conditions comprising at least one of object detection conditions, vehicle localization conditions and surrounding road users' conditions;
wherein the light output providing unit is configured to provide, when the light conditions fulfil insufficient light criteria representing insufficient light conditions for object detection in the captured surrounding and when the situational conditions fulfil light provision eligibility criteria, a light output illuminating a ground region of the surrounding.

14. The vision control system according to claim 9, wherein the light output providing unit is configured to provide a light output having one or more characteristics which are based on at least one of the light conditions and the situational conditions.

15. The vision control system according to claim 9, wherein the light output providing unit is configured to provide with support from at least a first light source comprises providing with support from at least a first light source comprised at least one of underneath and in a lower portion of the vehicle.

16. The vision control system according to claim 9, wherein the vision control system is comprised in a vehicle.

17. A non-transitory computer program storage medium storing a computer program containing computer program code that, when executed, causes one of a computer and a processor to perform a method for supporting object detection in low light conditions in surroundings of a moving vehicle by at least one of a first on-board rearward and sideward-facing image capturing device, the method comprising:
capturing a surrounding located at least one of rearward and sideward of the moving vehicle with support from the at least first image capturing device;
determining light conditions in the surrounding; and
providing with support from at least a first light source, when the light conditions fulfil insufficient light criteria representing insufficient light conditions for object detection in the captured surrounding, a light output illuminating a ground region of the surrounding to facilitate object detection by the at least first image capturing device, the at least first light source being provided by an entity positioned within a predeterminable distance from the vehicle in one or both of a secondary vehicle and a piece of infrastructure, the light output being based on a request signal indicative of the captured surrounding communicated to the entity.

* * * * *